(12) United States Patent
Weber et al.

(10) Patent No.: US 10,306,193 B2
(45) Date of Patent: *May 28, 2019

(54) TRIGGER ZONES FOR OBJECTS IN PROJECTED SURFACE MODEL

(71) Applicant: MICROSOFT TECHNOLOGY LICENSING, LLC, Redmond, WA (US)

(72) Inventors: Karon Weber, Kirkland, WA (US); Federico Zannier, Seattle, WA (US); Jean-Louis Villecroze, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 545 days.

This patent is subject to a terminal disclaimer.

(21) Appl. No.: 14/697,453

(22) Filed: Apr. 27, 2015

(65) Prior Publication Data

US 2016/0316185 A1 Oct. 27, 2016

(51) Int. Cl.
*H04N 9/31* (2006.01)
*H04N 5/33* (2006.01)
(Continued)

(52) U.S. Cl.
CPC .......... *H04N 9/3179* (2013.01); *G03B 17/54* (2013.01); *G06F 3/017* (2013.01); *G06F 3/0304* (2013.01);
(Continued)

(58) Field of Classification Search
CPC .......... H04N 9/3179; H04N 5/33; H04N 9/07; H04N 5/23293; H04N 5/2252; H04N 9/31;
(Continued)

(56) References Cited

U.S. PATENT DOCUMENTS

| 6,359,647 B1 | 3/2002 | Sengupta et al. |
| 6,535,118 B1 | 3/2003 | Takagi et al. |

(Continued)

FOREIGN PATENT DOCUMENTS

| EP | 2453388 A1 | 5/2012 |
| EP | 2746923 A1 | 6/2014 |

(Continued)

OTHER PUBLICATIONS

Mato, Mato, "AquaTop Display", Retrieved from <<https://www.youtube.com/watch?v=6lyudeTqggE>>, Feb. 13, 2013, 7 Pages.

(Continued)

*Primary Examiner* — Y Lee
(74) *Attorney, Agent, or Firm* — Alleman Hall Creasman & Tuttle LLP

(57) ABSTRACT

An integrated processing and projection device suitable for use on a supporting surface includes a processor and a projector designed to provide a display on the supporting surface proximate to the device. Various sensors enable object and gesture detection in a detection area in the display area. Trigger zones are defined in the detection area such that interaction of an object or human limb in the detection zone provides object and zone specific feedback by the integrated processing and projection device. The feedback can be provided in the projection area or may be provided as audible or active feedback to a device having active feedback capabilities.

11 Claims, 16 Drawing Sheets

(51) Int. Cl.

| | |
|---|---|
| *H04N 9/07* | (2006.01) |
| *H04N 5/232* | (2006.01) |
| *H04N 5/225* | (2006.01) |
| *G06F 3/01* | (2006.01) |
| *G06F 3/03* | (2006.01) |
| *G06K 9/20* | (2006.01) |
| *G06F 3/0481* | (2013.01) |
| *G06K 9/00* | (2006.01) |
| *G03B 17/54* | (2006.01) |

(52) U.S. Cl.
CPC ..... *G06F 3/04812* (2013.01); *G06K 9/00375* (2013.01); *G06K 9/00771* (2013.01); *G06K 9/209* (2013.01); *G06K 9/2018* (2013.01); *H04N 5/2252* (2013.01); *H04N 5/23293* (2013.01); *H04N 5/33* (2013.01); *H04N 9/07* (2013.01); *G06F 2203/014* (2013.01)

(58) Field of Classification Search
CPC ... H04N 5/225; G06F 3/04812; G06F 3/0304; G06F 3/017; G06F 2203/014; G03B 21/00; G06K 9/00355; G06K 9/00671; G06K 9/2018
USPC ........................................................ 348/164
See application file for complete search history.

(56) References Cited

U.S. PATENT DOCUMENTS

| | | | |
|---|---|---|---|
| 6,670,910 | B2 | 12/2003 | Delcheccolo et al. |
| 6,809,760 | B1 | 10/2004 | Takagi et al. |
| 6,972,787 | B1 | 12/2005 | Allen et al. |
| 7,176,440 | B2 | 2/2007 | Cofer et al. |
| 7,529,411 | B2 | 5/2009 | Haupt et al. |
| 7,639,231 | B2 | 12/2009 | Parry et al. |
| 7,720,260 | B2 | 5/2010 | Macneille et al. |
| 7,806,604 | B2 | 10/2010 | Bazakos et al. |
| 8,174,572 | B2 | 5/2012 | Buehler et al. |
| 8,188,880 | B1 | 5/2012 | Chi et al. |
| 8,243,989 | B2 | 8/2012 | Vendrig |
| 8,292,733 | B2 | 10/2012 | Crawford et al. |
| 8,734,214 | B2 | 5/2014 | Hughes et al. |
| 8,751,049 | B2 | 6/2014 | Linder et al. |
| 9,429,833 | B1* | 8/2016 | Satoh ................ G06F 3/042 |
| 2005/0029458 | A1* | 2/2005 | Geng ............. G08B 13/19608 250/347 |
| 2005/0276448 | A1* | 12/2005 | Pryor ................ B60K 35/00 382/103 |
| 2007/0083896 | A1 | 4/2007 | Staples |
| 2009/0030551 | A1 | 1/2009 | Hein et al. |
| 2009/0102859 | A1 | 4/2009 | Athsani et al. |
| 2010/0073686 | A1 | 3/2010 | Medeiros et al. |
| 2010/0199232 | A1 | 8/2010 | Mistry et al. |
| 2010/0210361 | A1 | 8/2010 | Crawford et al. |
| 2010/0302247 | A1 | 12/2010 | Perez et al. |
| 2010/0315413 | A1* | 12/2010 | Izadi .................. G06F 3/017 345/419 |
| 2011/0102553 | A1* | 5/2011 | Corcoran .......... G06K 9/00281 348/50 |
| 2011/0193939 | A1* | 8/2011 | Vassigh .............. G06F 3/011 348/46 |
| 2011/0197147 | A1* | 8/2011 | Fai ..................... G06F 1/1639 715/753 |
| 2011/0269540 | A1 | 11/2011 | Gillo et al. |
| 2012/0098859 | A1 | 4/2012 | Lee et al. |
| 2012/0127284 | A1 | 5/2012 | Bar-Zeev et al. |
| 2012/0261473 | A1* | 10/2012 | Bombaugh ........ G06K 7/10603 235/462.11 |
| 2012/0299876 | A1 | 11/2012 | De Leon et al. |
| 2013/0024819 | A1 | 1/2013 | Rieffel et al. |
| 2013/0055143 | A1 | 2/2013 | Martin et al. |
| 2013/0159350 | A1 | 6/2013 | Sankar et al. |
| 2013/0278631 | A1* | 10/2013 | Border ................ G02B 27/017 345/633 |
| 2013/0328762 | A1 | 12/2013 | McCulloch et al. |
| 2013/0343601 | A1 | 12/2013 | Jia et al. |
| 2014/0028712 | A1 | 1/2014 | Keating et al. |
| 2014/0205139 | A1 | 7/2014 | Kriel et al. |
| 2014/0361985 | A1 | 12/2014 | Arai |
| 2014/0368456 | A1 | 12/2014 | Sakai |
| 2015/0085155 | A1 | 3/2015 | Diaz et al. |
| 2015/0199089 | A1 | 7/2015 | Lee et al. |
| 2016/0103498 | A1* | 4/2016 | Yamaguchi ............ G06F 3/017 345/156 |
| 2016/0316113 | A1 | 10/2016 | Zannier et al. |
| 2016/0329006 | A1 | 11/2016 | Weber et al. |

FOREIGN PATENT DOCUMENTS

| | | |
|---|---|---|
| JP | 2014207544 | 10/2014 |
| WO | 2013019255 A1 | 2/2013 |
| WO | 2014101955 A1 | 7/2014 |

OTHER PUBLICATIONS

"International Search Report & Written Opinion Issued in PCT Application No. PCT/US2016/026080", dated Jun. 29, 2016, 12 Pages.
"International Search Report & Written Opinion Issued in PCT Application No. PCT/US2016/026079", dated Jun. 29, 2016, 13 Pages.
"International Search Report & Written Opinion Issued in PCT Application No. PCT/US2016/026295", dated Jun. 29, 2016, 12 Pages.
Preliminary Amendment filed May 5, 2016 in U.S. Appl. No. 14/703,637, 4 pages.
Office Action dated Jun. 30, 2016 in U.S. Appl. No. 14/703,637, 17 pages.
Response to Office Action filed Sep. 30, 2016 in U.S. Appl. No. 14/703,637, 9 pages.
Office Action dated Nov. 25, 2015 in U.S. Appl. No. 14/703,637, 17 pages.
Machine translation of JP2014207544 published Oct. 8, 2014.
PCT Demand and Response to International Search Report filed Oct. 13, 2016 in PCT Application No. PCT/US2016/026079, 16 Pages.
Office Action dated Feb. 6, 2017 in U.S. Appl. No. 14/697,432.
Response to Office Action filed Feb. 27, 2017 in U.S. Appl. No. 14/703,637.
Lee, et al., "An Efficient Camera Hand-Off Filter in Real-Time", In international Journal of innovative Computing, Information and Control, vol. 8, No. 2, Feb. 2012, 21 pages.
Danieau, et al., "HapSeat: Producing Motion Sensation with Multiple Force-feedback Devices Embedded in a Seat", In Proceedings of the 18th ACM symposium on Virtual reality software and technology, Dec. 10, 2012, 8 pages.
Ceurstemont, Sandrine, "Virtual car race lets you feel the swerve", Published on: Jun. 10, 2011 Available at: http://www.newscientist.com/blogs/nstv/2011/06/virtual-car-race-lets-you-feel-the-swerve.html.
Paolis, et al., "An Interactive and Immersive 3D Game Simulation Provided with Force Feedback", In First International Conference on Advances in Computer-Human Interaction, Feb. 10, 2008, 5 pages.
Varley, Laura, "Microsoft Patent Suggests Xbox 720 may have Game Environment Projection", Published on Sep. 11, 2012, Available at: http://www.geek.com/games/microsoft-patent-suggests-xbox-720-may-have-game-environment-projection-system-1514963/.
Kain, Erik, "Microsoft Is Developing 3D Projection Technology That Could Turn Your Room into a Game", Published on: Sep. 11, 2012 Available at: http://www.forbes.com/sites/erikkain/2012/09/11/microsoft-is-developing-3d-projection-technology-that-could-turn-your-room-into-a-game.

(56) References Cited

OTHER PUBLICATIONS

"CastAR: the most versatile AR & VR system", Published on: Oct. 14, 2013 Available at: https://www.kickstarter.com/projects/technicalillusions/castar-the-most-versatile-ar-and-vr-system.

Gibbs, Samuel, "Microsoft's RoomAlive turns a living room into a Star Trek Holodeck", Published on: Oct. 6, 2014, Available at: http://www.theguardian.com/technology/2014/oct/06/microsoft-roomalive-star-trek-holodeck.

McQueen et al., U.S. Appl. No. 14/307,339, "Recognizing Interactions with Hot Zones", filed Jun. 17, 2014.

"RGB-D Object Recognition and Detection", Published on: May 2, 2013 Available at: http://www.cs.washington.edu/research-projects/robotics/rgbd-object-recognition-and-detection.

Sato, et al., "Nonoverlapped View Management for Augmented Reality by Tabletop Projection", Retrieved on: Oct. 13, 2014, Available at: http://ksiresearchorg.ipage.com/seke/dms14paper/paper49.pdf.

Weigel, et al., "ProjectorKit: Easing Rapid Prototyping of Interactive Applications for Mobile Projectors", In Proceedings of the 15th international conference on Human-computer interaction with mobile devices and services, Aug. 27, 2013, 4 pages.

Huber, et al., "LightBeam: Interacting with Augmented Real-World Objects in Pico Projections", In Proceedings of 11th International Conference on Mobile and Ubiquitous Multimedia, Dec. 4, 2012, 10 pages.

Siriborvornratanakul, et al., "Augmenting Physical Objects by a Ubiquitous Spatial Projection Display Operating in the Visible Light Spectrum", In Proceedings of International Journal of Information Processing and Management, vol. 2, No. 1, Jan. 2011, 17 pages.

"Second Written Opinion Issued in PCT Application No. PCT/US2016/026080", dated Mar. 7, 2017, 7 Pages.

"International Preliminary Report on Patentability Issued in PCT Application No. PCT/US2016/026080", dated Jun. 13, 2017, 7 Pages.

"International Preliminary Report on Patentability Issued in PCT Application No. PCT/US2016/026079", dated Jun. 13, 2017, 16 Pages.

Response to Office Action filed May 8, 2017, in U.S. Appl. No. 14/697,432, 10 Pages.

Final Office Action dated May 25, 2017, in U.S. Appl. No. 14/703,637, 19 Pages.

Final Office Action dated Sep. 22, 2017, U.S. Appl. No. 14/697,432 filed Apr. 27, 2015.

"Second Written Opinion Issued in PCT Application No. PCT/US2016/026079", dated Mar. 13, 2017, 9 Pages.

\* cited by examiner

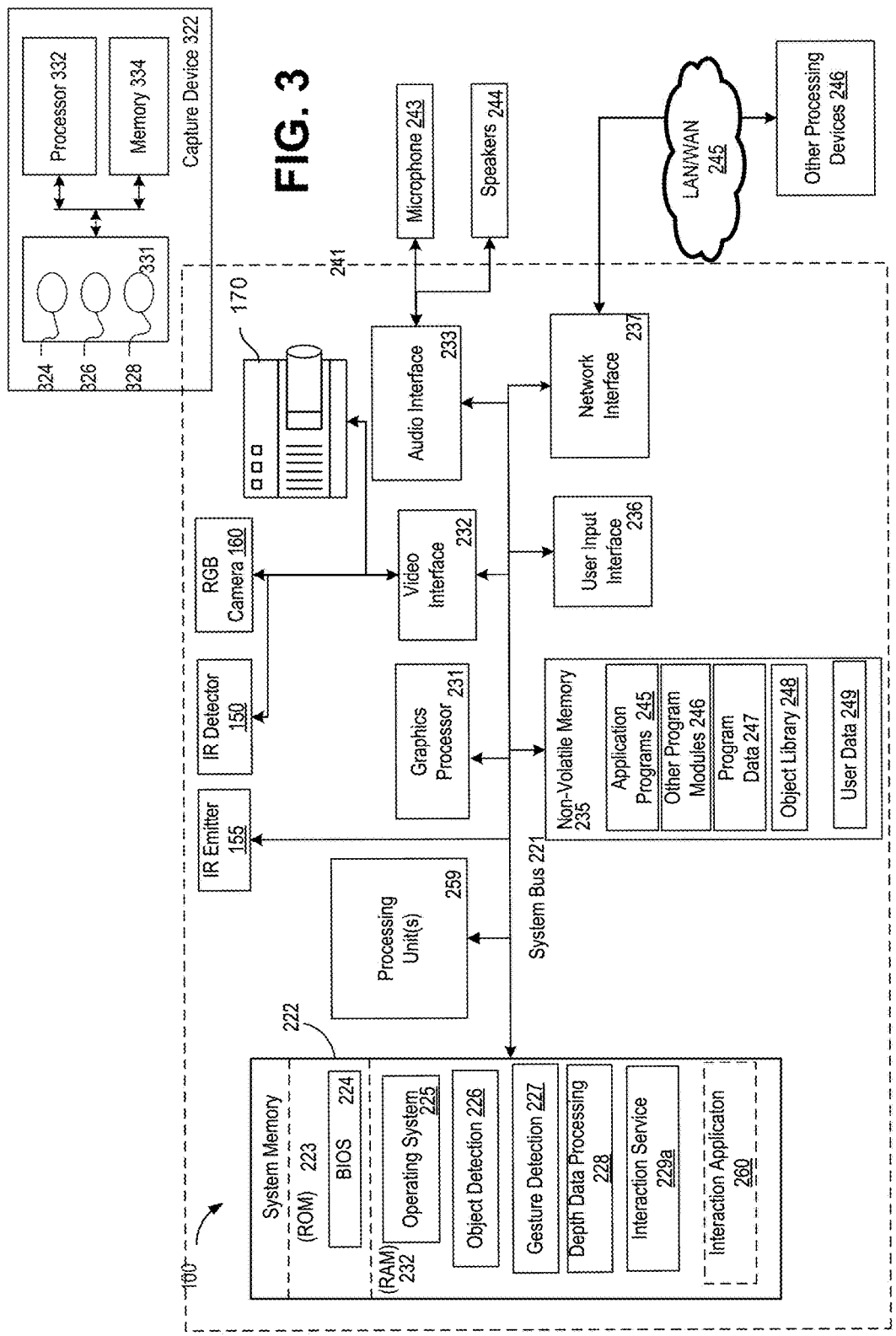

TRIGGER ZONES FOR OBJECTS IN PROJECTED SURFACE MODEL

BACKGROUND

The capabilities of computing devices have continuously expanded to include ever more capabilities and convenience. From personal computers integrated with monitors to wearable computers, computing devices have progressed toward integrated devices. Each of such integrated computing devices presents a unique set of problems which must be overcome to provide a truly integrated and natural computing experience.

Various types of sensors have been utilized in conjunction with integrated computing systems including RGB cameras in, for example, laptop computers. The sensors have been utilized to provide different forms of interfaces that can be used with various types of computing devices.

SUMMARY

The technology, briefly described, includes an integrated processing and projection device suitable for use on a supporting surface. The device includes a processor and a projector designed to provide a display on the supporting surface proximate to the device. Various sensors enable object and gesture detection in a detection area in the display area. Trigger zones are defined in the detection area such that interaction of an object or human limb in the detection zone provides object and zone specific feedback by the integrated processing and projection device. The technology integrates the various available sensors in the integrated processing and projection device to detect active and passive objects, as well as user gestures, in the display area using various techniques to integrate all available sensors and provide an accurate identification of such objects and gestures. The feedback can be provided in the projection area or may be provided as audible or active feedback to a device having active feedback capabilities. In accordance with the present technology, object specific feedback is provided based on the object identified and interaction between the object and/or a user with trigger zones defined in a detection area.

An integrated processing and projection system may include a display projector in a housing, the display projector being adapted to display an interface in a display area on a surface supporting the housing. The system includes an RGB camera, an infrared emitter and infrared detector, and optionally a depth camera. The RGB camera, emitter and detector establish a detection area adjacent to the surface and overlapping the display area. A processor and memory are integrated into the system. The memory includes code operable to instruct the processor to establish one or more trigger zones in a corresponding one or more regions of the detection area and cause object feedback to emanate from the system using one or more output elements when interaction by an object with a trigger zone occurs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a block diagram depicting the internal components of the integrated processing and projection device.

DETAILED DESCRIPTION

Technology is presented for an integrated processing and projection device suitable for use on a supporting surface. The device includes a processor and a projector designed to provide a display on the supporting surface of the device. Various sensors enable object and gesture detection in the display area. The technology integrates the various available sensors in the integrated processing and projection device to detect active and passive objects, as well as user gestures, in the display area using various techniques to integrate all available sensors and provide an accurate identification of such objects and gestures.

Trigger zones are defined around objects in the detection area such that interaction of an object or human limb in the detection zone provides object and zone specific feedback by the integrated processing and projection device. The feedback can be provided in the projection area or may be provided as audible or active feedback to a device having active feedback capabilities. In accordance with the present technology, object specific feedback is provided based on the object identified and interaction between the object and/or a user with trigger zones defined in a detection area.

Figure 1:
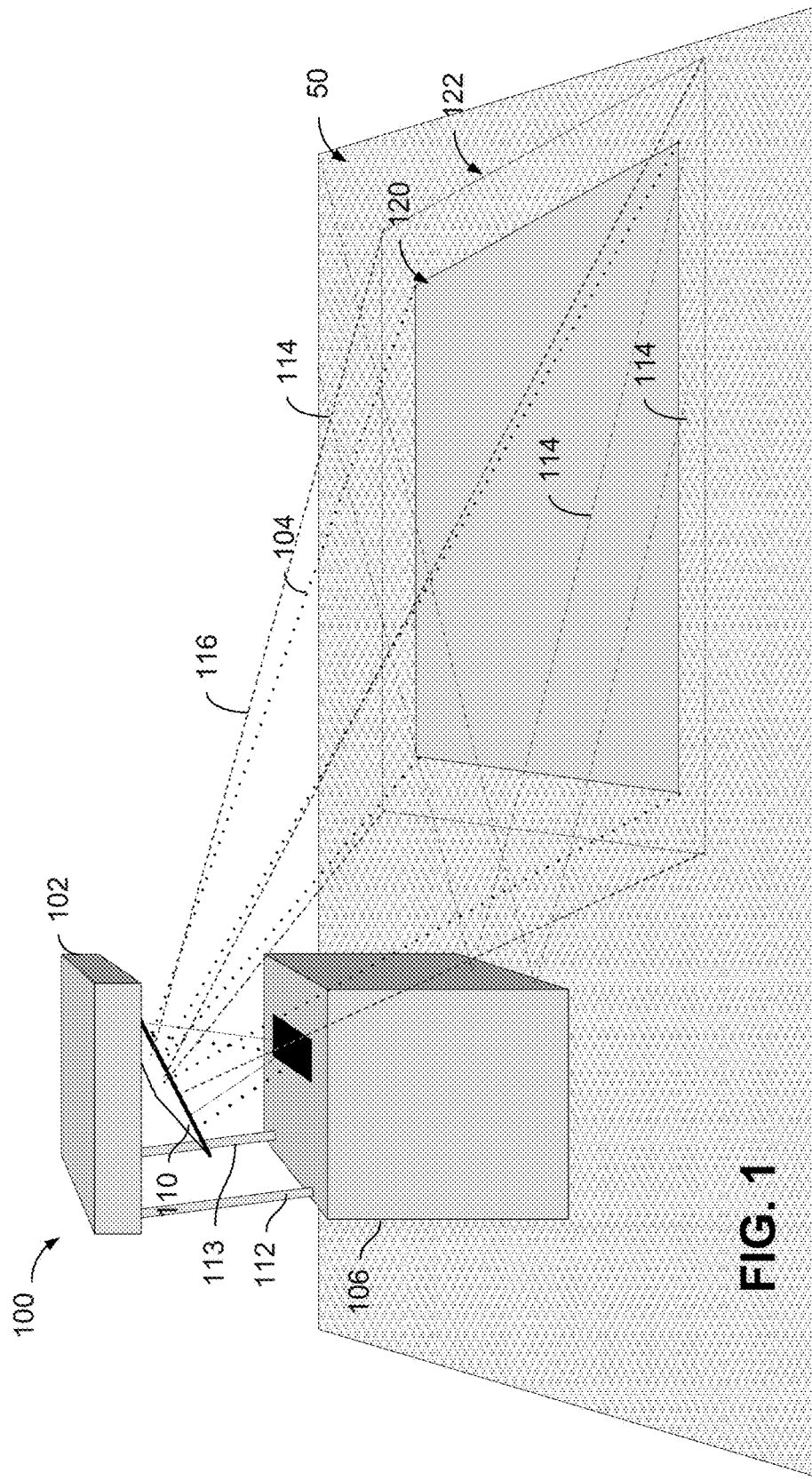
FIG. 1 depicts a perspective view of an integrated processing and projection device on a supporting surface.
Figure 2:
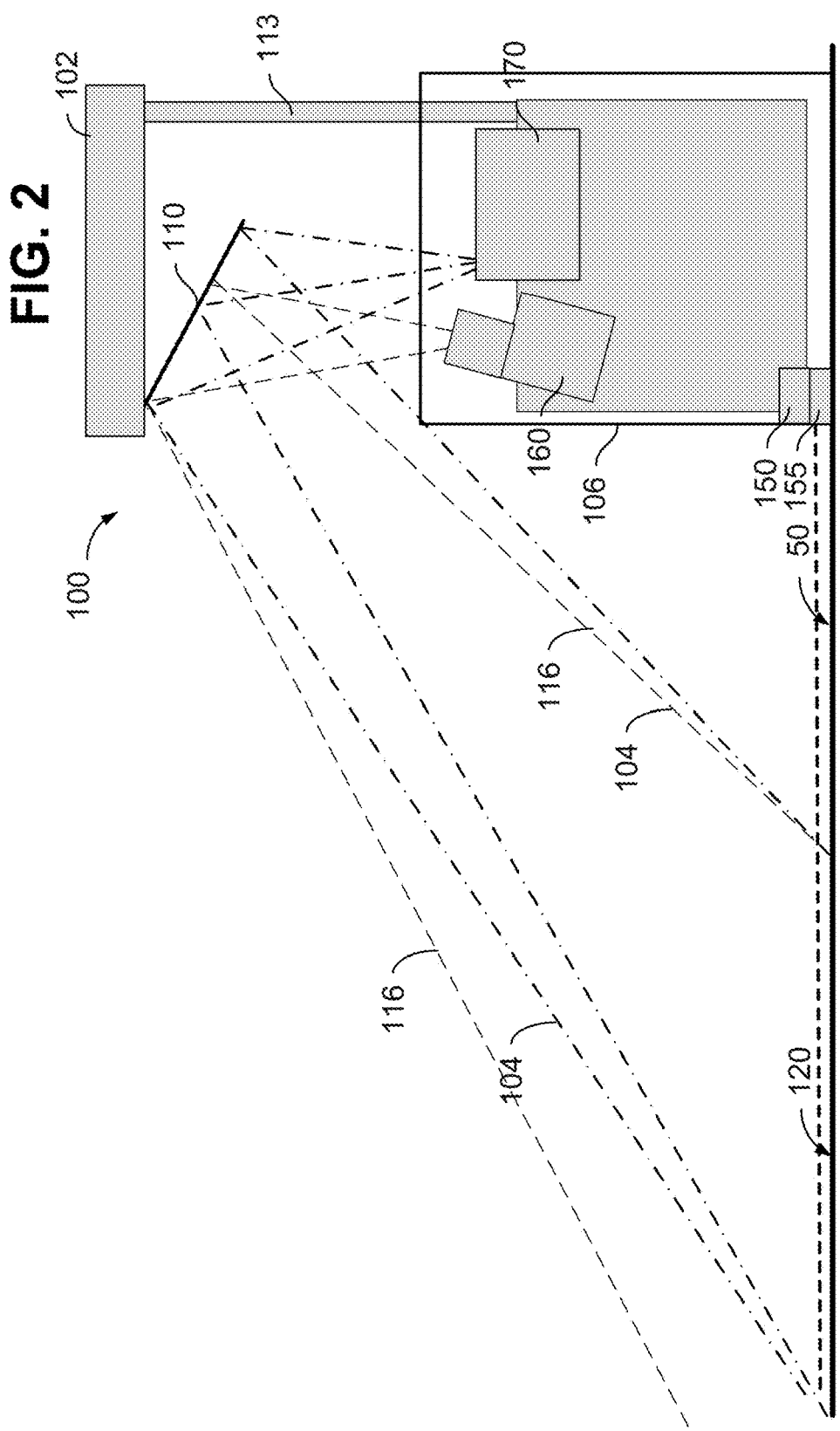
FIG. 2 depicts a side view of the integrated processing and projection device.

FIG. 1 illustrates a perspective view of an interactive processing and projection device 100. Interactive processing and projection device 100 will be described with respect to the various figures herein. FIG. 2 is a side view of the device 100 and FIG. 3 is a block diagram illustrating various components of device 100.

As illustrated in FIGS. 1-3, a first embodiment of an integrated processing and projection device 100 is designed to be supported on a supporting surface 50 and to project into a display area 120 various interfaces and interactive displays. Interfaces may be projected and used in the display area 120, with objects and gestures of users which occur in the display area being detected by various sensors and a processor in housing 106. Device 100 includes, in one embodiment, a projector 170, and sensors including an RGB camera 160, an infrared emitter 155 and an infrared detector or camera 150, all provided in housing 106. The sensors detect interactions in a detection area 122 which encompasses the display area 120. The housing 106 may be supported by any supporting surface 50 and may project a display area 120 onto the supporting surface or other surfaces as described herein. Various components provided in housing 106 are illustrated in FIG. 3.

Figure 4C:
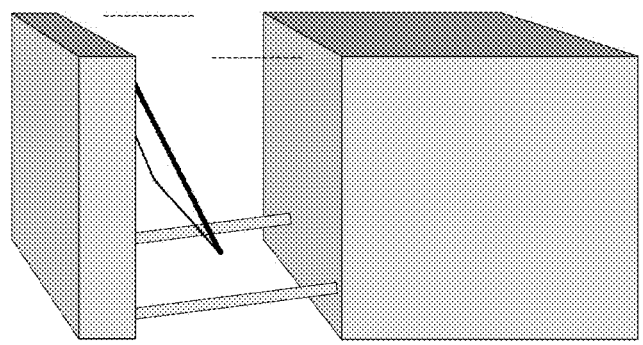
FIGS. 4A, 4B, and 4C illustrate the expansion of the projection system in the integrated processing and projection device.
Figure 4B:
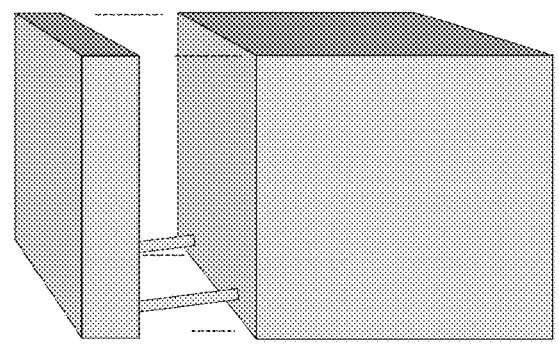
Figure 4A:
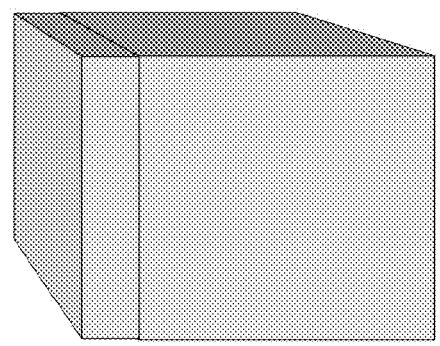

Housing 106 includes a lid portion 102 having mounted therein a rotatable mirror 110. Lid 102 is supported by arms 112, 113 which can raise and lower lid 102 as illustrated in FIGS. 4A through 4C. Arms 112, 113 are connected to lid 102 at one end and motors (not shown) provided in the housing 106 which operate to raise and lower the lid. Mirror 110 in lid 102 provides both an output for the projector 170 and reflects the display area 120 into a field of view for RGB camera 160. FIG. 4A illustrates the closed position of the device 100, FIG. 4B illustrates a partially raised lid 102 and FIG. 4C illustrates a fully raised lid 102 with mirror 110 rotated into a fully extended position. Mirror 110 can be mounted on a spring-loaded hinge or mounted to a motor and hinge (not shown) to allow extension and retraction of the mirror 110 between the open and closed positions illustrated in FIGS. 4C and 4A respectively.

As illustrated in FIGS. 1 and 2, infrared emitters which may comprise infrared light emitting diodes (LEDs) illuminate a detection area 122 which in one embodiment is larger than the display area 120. Emitters 155 are mounted near the bottom of the housing 106 so as to illuminate an area of the supporting surface in the display area 120 adjacent to the supporting surface 50. IR illumination represented at 114 illuminates any object close to the surface 50 in the projection area 120 and is useful in detecting surface interactions by objects and user hands. Projector emissions 104 from the projector 170 illuminate the projection area 120 with visible light. The field of view 116 of camera 160 may be larger than the projection area 120 and encompass the detection area 122.

Figure 5:
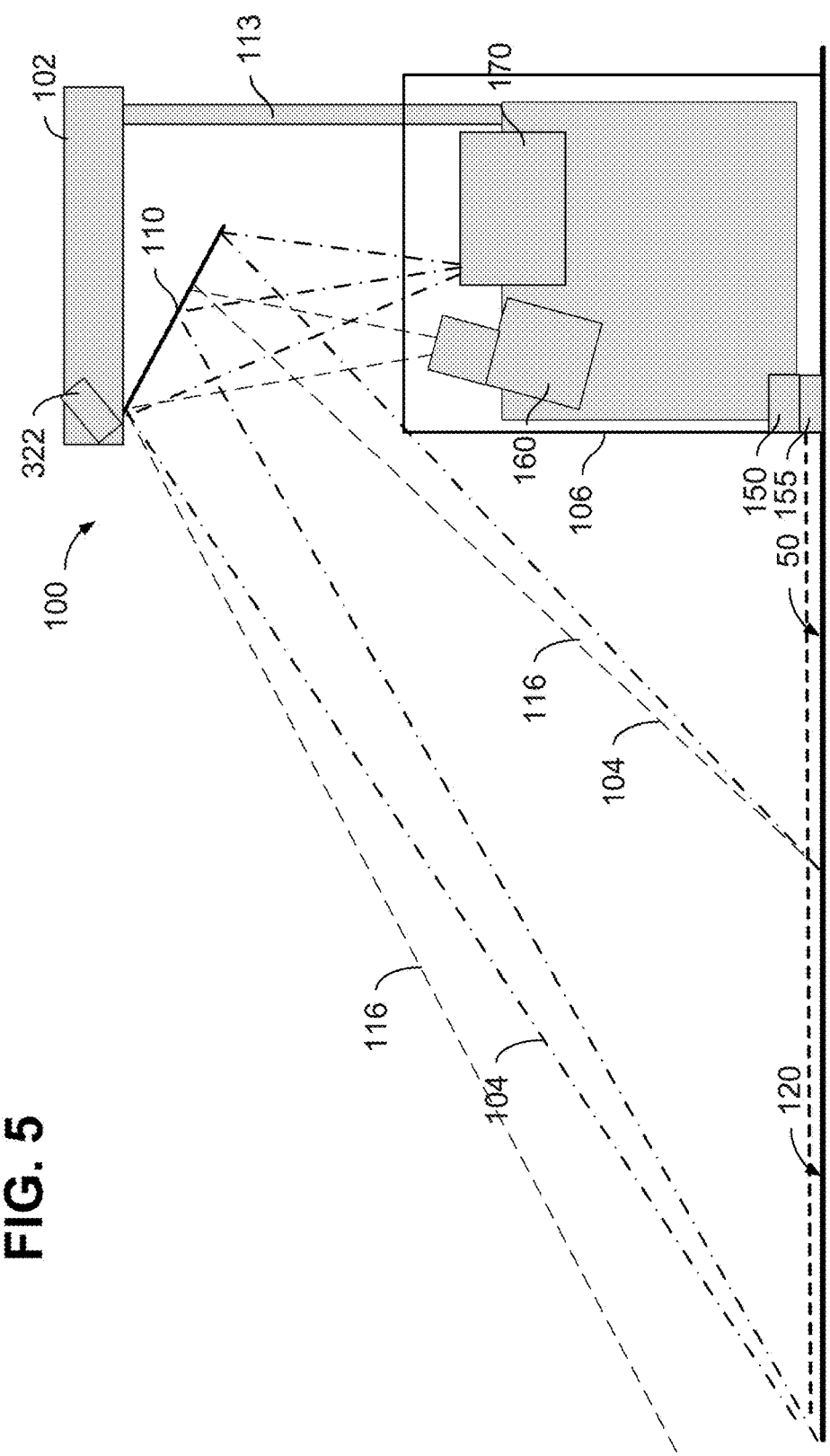
FIG. 5 is a partial side view of a second embodiment of an integrated processing and projection device.

A second embodiment of device 100 is illustrated in FIG. 5. The embodiment of FIG. 5 includes the components of the embodiment of FIGS. 1-2 and further includes a capture device 322. The capture device may be positioned in a manner that it is focused at the detection area 122, or may alternatively have other positions and be directed to detect and track users who are proximate to device 100.

FIG. 3 illustrates the components which may be included in the both embodiments of the apparatus 100. Differences between the respective embodiments will be noted where applicable. (For example, in FIG. 3, a capture device 322 is illustrated but it should be understood that in one embodiment such as that illustrated with respect to FIGS. 1 and 2, no capture device need be used.) The components of device 100 are one example of a suitable computing environment and is not intended to suggest any limitation as to the scope of use or functionality of the present system. Neither should the device 100 be interpreted as having any dependency or requirement relating to any one or combination of components illustrated in the exemplary device 100.

With reference to FIG. 3, an exemplary device 100 for use in performing the above-described methods includes a one or more processors 259 adapted to execute instructions in the form of code to implement the various methods described herein. Components of computing system 300 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 222 includes computer storage media in the form of volatile and/or nonvolatile memory such as read only memory (ROM) 223 and random access memory (RAM) 232. A basic input/output system (BIOS) 224, containing the basic routines that help to transfer information between elements within device 100, such as during start-up, is typically stored in ROM 223. RAM 232 typically contains data and/or program modules that are immediately accessible to and/or presently being operated on by processing unit 259. By way of example, and not limitation, FIG. 3 illustrates operating system 225, an object detection component 225, a gesture recognition component 227, a depth data processing component 228 (for the embodiment of FIG. 5) and an interaction service component 229a.

Object detection component 226 includes instructions for enabling the processing units 259 to detect both passive and active objects in the object detection area 122. Gesture detection component 227 allows detection of user hand and object gestures within the detection area 122. Depth data processing component 228 allows for the depth image data provided by capture device 322 to be utilized in conjunction with the RGB image data and the IR detector data to determine any of the objects or gestures described herein. Interaction service component 229a provides a communication path to allow users with other processing devices to communicate with the device 100.

Device 100 may also include other removable/non-removable, volatile/nonvolatile computer storage media. By way of example only, FIG. 3 illustrates non-volatile memory 235 which may comprise a hard disk drive, solid state drive, or any other removable or non-removable, nonvolatile magnetic media including magnetic tape cassettes, flash memory cards, DVDs, digital video tape, solid state RAM, solid state ROM, and the like. The non-volatile media illustrated in FIG. 3 provide storage of computer readable instructions, data structures, program modules and other data for device 100. In FIG. 3, for example, non-volatile memory 235 is illustrated as storing operating system application programs 245, other program modules 246, and program data 246 another object library 248 and user data 249. Non-volatile memory 235 may store other components such as the operating system and application programs (not shown) for use by processing units 259. A user may enter commands and information into the computer 241 through input interfaces projected into the detection area 122, or through conventional input devices such as a keyboard and pointing device. These and other input devices are often connected to the processing unit 259 through a user input interface 236 that is coupled to the system bus, but may be connected by other interface and bus structures, such as a parallel port, game port or a universal serial bus (USB).

The computer 241 may operate in a networked environment using logical connections to one or more remote computers, such as a remote computer 246. The remote computer 246 may be a personal computer, a server, a router, a network PC, a peer device or other common network node. The logical connections depicted include a local area network (LAN) and a wide area network (WAN) 245, but may also include other networks. Such networking environments are commonplace in offices, enterprise-wide computer networks, intranets and the Internet. When used in a LAN networking environment, the computer 241 is connected to the LAN/WAN 245 through a network interface or adapter 237. In a networked environment, program modules depicted relative to the computing system 100, or portions thereof, may be stored in the remote processing devices 246.

The RGB camera 160 and IR detector 150 may be coupled to a video interface 232 which processes input prior to input to the processing units 259. A graphics processor 231 may be utilized to offload rendering tasks from the processing units 259. IR Emitter 150 operates under the control of processing units 259. Projector 170 is coupled to video interface 232 to output content to the display area 120. Video interface 232 operates in conjunction with user input interface 236 to interpret input gestures and controls from a user which may be provided in the display area 122.

A user may enter commands and information into the device 100 through conventional input devices, but optimally a user interface is provided by the projector 170 into the display area 120 when input is utilized by any of the applications operation on or in conjunction with device 100.

A capture device 322 may optionally be provided in one embodiment as shown in FIG. 5. Capture device 322 includes an image camera component having an IR light component 324, a three-dimensional (3-D) camera 326, and a second RGB camera 328, all of which may be used to capture the depth image of a capture area 122. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 331.

In time-of-flight analysis, the IR light component 324 of the capture device 322 may emit an infrared light onto the capture area and may then use sensors to detect the backscattered light from the surface of one or more objects in the capture area using, for example, the 3-D camera 326 and/or the RGB camera 328. In some embodiments, pulsed infrared light may be used such that the time between an outgoing light pulse and a corresponding incoming light pulse may be measured and used to determine a physical distance from the capture device 322 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 324. Upon striking the surface of one or more objects (or targets) in the capture area, the pattern may become deformed in response. Such a deformation of the pattern may be captured by, for example, the 3-D camera 326 and/or the RGB camera 328 and analyzed to determine a physical distance from the capture device to a particular location on the one or more objects. Capture device 322 may include optics for producing collimated light. In some embodiments, a laser projector may be used to create a structured light pattern. The light projector may include a laser, laser diode, and/or LED.

The capture device 322 may include a processor 332 that may be in communication with the image camera component 331. The processor 332 may include a standardized processor, a specialized processor, a microprocessor, or the like. The processor 332 may execute instructions that may include instructions for receiving and analyzing images. It is to be understood that at least some image analysis and/or target analysis and tracking operations may be executed by processors contained within one or more capture devices such as capture device 322.

The capture device 322 may include a memory 334 that may store the instructions that may be executed by the processor 332, images or frames of images captured by the 3-D camera or RGB camera, filters or profiles, or any other suitable information, images, or the like. As depicted, the memory 334 may be a separate component in communication with the image capture component 331 and the processor 332. In another embodiment, the memory 334 may be integrated into the processor 334 and/or the image capture component 331.

The capture device 322 may be in communication with the device 100 via a communication link. The communication link 46 may be a wired connection including, for example, a USB connection, a FireWire connection, an Ethernet cable connection, or the like and/or a wireless connection such as a wireless 802.11b, g, a, or n connection.

The cameras 326, 328 and capture device 331 may define additional input devices for the device 100 that connect via user input interface 236. In addition, device 100 may incorporate a microphone 243 and speakers 244 coupled to an audio interface 233.

Figure 6:
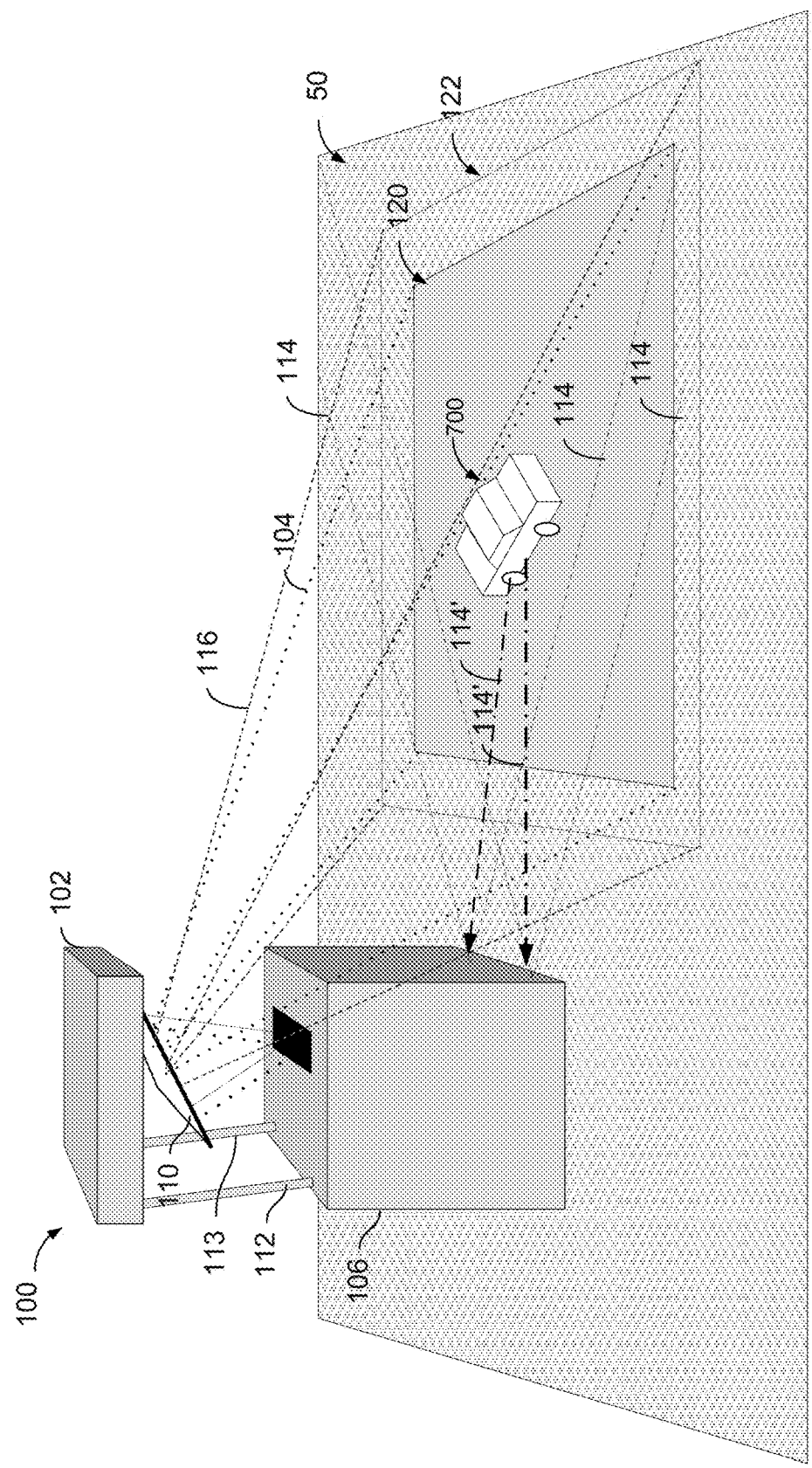
FIG. 6 is a perspective view of the integrated processing and projection device illustrating detection of an object in a display and detection area.

FIG. 6 illustrates the sensors including RGB camera 160 and IR detector 150 receiving input from the real object 700 in the detection area 122 and display area 120. As illustrated therein, illumination from the projector 170 illuminates the display area 120, allowing the RGB camera 162 receive an image of the detection area 122 and generate image data for use in identifying the object 700. Likewise, the IR emitter beams 114 reflect off of the object 700 and return at 114' to the IR detectors 150. The example shown in FIGS. 6 and 7, the real object 700 is a car. The real object may comprise any passive or active real object, where an active object includes features and functions which may be controlled by signals from a processing device such as device 100.

The various real objects depicted herein such as object 700, 710 may be active or passive objects. Passive objects are those which have no internally controllable features. Controllable features may be those which cause the object to perform some function. For example, a car object may have a motor which allows the wheels of the car to turn or a sound generator to emit simulated engine noise. A toy helicopter may have a motor to rotate various parts of the helicopter. Any number of active objects may be utilized in accordance with the teachings herein. In some embodiments, active objects have communication channels allowing the active objects to communicate with other devices to enable features of the object. For example, where object 700 is an active object, the object 700 may include a Bluetooth communication channel allowing device 100 to connect to object 700 and provide instructions to object 700. The nature of the communication channel in the object may be any number of different communication transport mechanisms, including Bluetooth, RF, WiFi and other wireless transport schemes.

Figure 8:
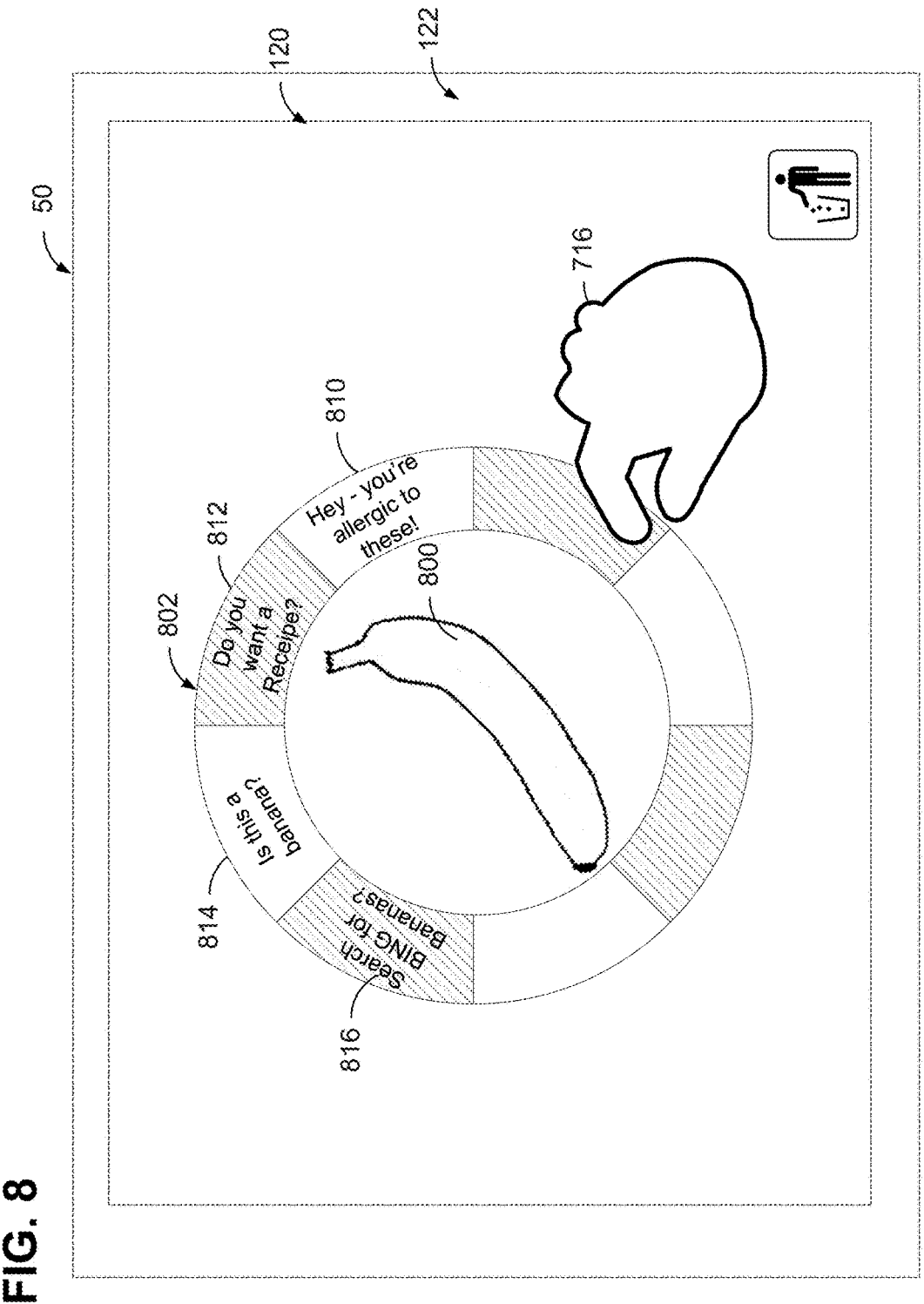
FIG. 8 is an illustration of a projected interface in a display area provided by the integrated processing and projection device.

To distinguish between, for example, the car 700 and the object 800 in FIG. 8, image search techniques may be utilized in accordance with the various illumination and capture techniques described herein. It should be understood that the apparatus illustrated in FIG. 5, including a capture device may be utilized in addition to the IR detector 150 and RGB camera 160 in order to identify either the objects 700 or 800.

Figure 7:
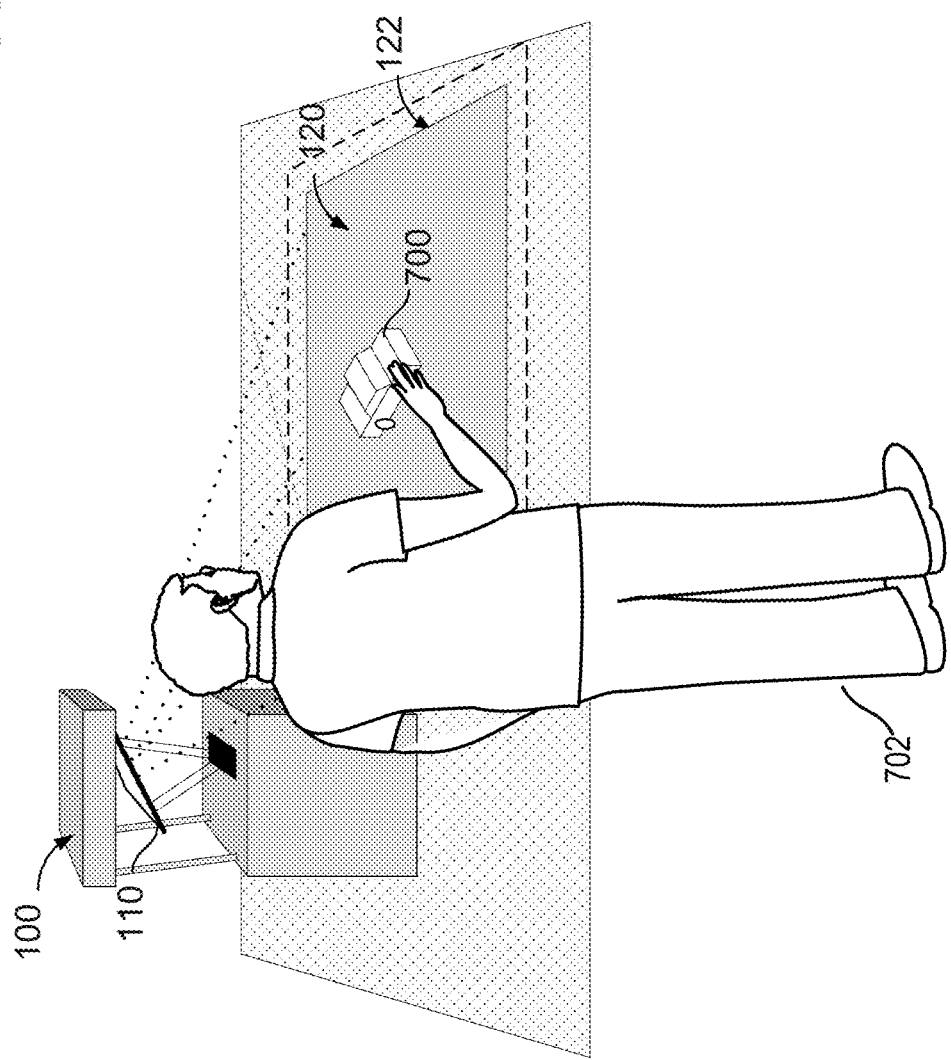
FIG. 7 is a perspective view of the integrated processing and projection device illustrating user interaction with an object in a display and projection area.

As illustrated in FIG. 7, a user 702 may manipulated an object 700 in the display area 120. In the interaction shown in FIG. 7, the user manipulates object 700 by moving the object on the surface 50. Other examples may include a user making gestures with or without an object in and above the display area 120 (and within a field of view of camera 160 and IR detector 155). Various interactions and responses may be provided by the device 100 using any of the feedback mechanisms (display, sound, etc.) from the device 100 and by actively controlling real objects in the detection area based on active control signals from device 100 (where the object such as object 700 has actively controlled features).

FIG. 8 illustrates an exemplary user interface 802 allowing user to provide feedback on the real object 800 in a detection area 122. Illustrated in FIG. 8 is a display menu 802 which is illustrated as a two-dimensional circular menu surrounding a real object 800, which in this example is a banana. A number of touch sensitive display areas 810, 812, 814, 816, allow the user to select one of a different number of input prompts provided by the device 100. Each prompt may, for example, provide options to allow the user to specifically identify the real object 800, or provide preferences on what type of information the user may provide with respect to the object 800. For example, if the device determines that the object is banana, any number of different types of information may be provided for the banana. For example, the user may wish to know more about bananas in general, user may know which type of banana or nutritional information is available about the banana, or the user may request information on recipes which may be utilized incorporating ingredients of bananas. In order to allow the device to specifically identify both the type of real object 800 that is identified, and the type of information, any of a various number of different types of user interfaces 1500 may be provided.

Each of the areas 810, 812, 814, 816, may comprise a two-dimensional (or three dimensional) trigger zone illustrated by the projector on the surface 50 in the display area and defined by an application on the integrated processing and projection device 100. In one example, areas 810, 812, 814, 816, are two dimensional areas which identify a user touch on surface 50 to activate or select a particular menu item.

As noted above, the integrated processing and projection device 100 can illuminate the display area 120 and any number of different manners. In accordance with the present technology, object specific feedback is provided based on the object identified and interaction between the object and/or a user with trigger zones defined in a detection area 122.

Figure 9:
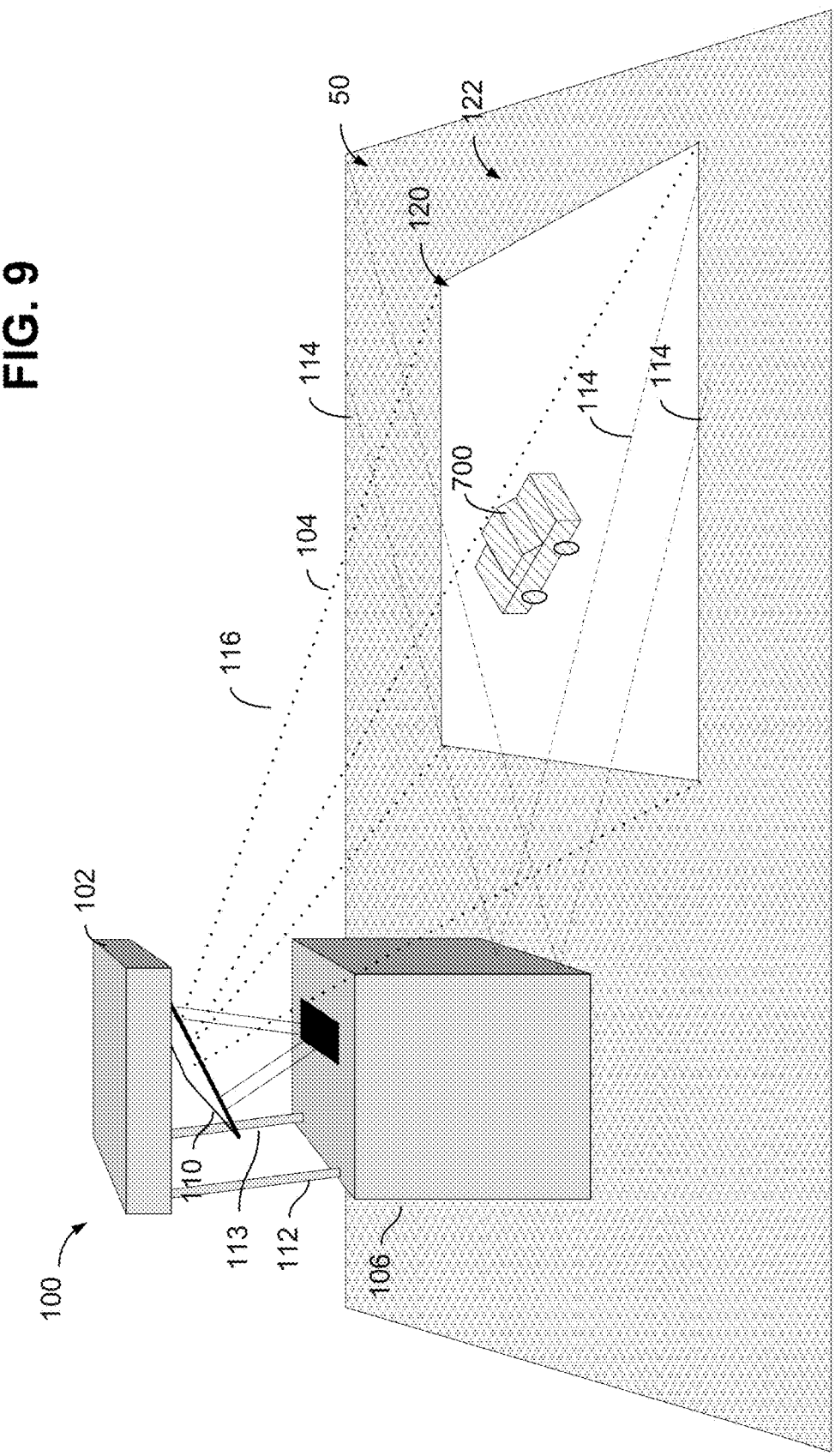
FIG. 9 is a perspective view of the integrated processing and projection device illustrating projection of feedback on an object in the display area.

FIG. 9 illustrates one exemplary type of object and trigger specific feedback using projection of a color or pattern onto real object 700. In FIG. 9, real object 700 has projected thereon a specific pattern or color indicated by the crosshatching on the object 700. In this example, the projection is focused on the object boundaries so that the color or pattern does not appear to a user to be on surface 50 but only on car object 700. The projection can move with the object as the object moves in the display area 120, with the various sensors tracking movement of the object (and the user) within the display area 120. This type of feedback provided to the real objects 700 can be controlled by the nature of the object 700 itself and an application program (260) running in the device 100. Such feedback may be provided to both passive and active objects, with active objects further having specific controls and features which may be enabled to provide interactivity under control of an application and device 100, as described below.

Figure 10:
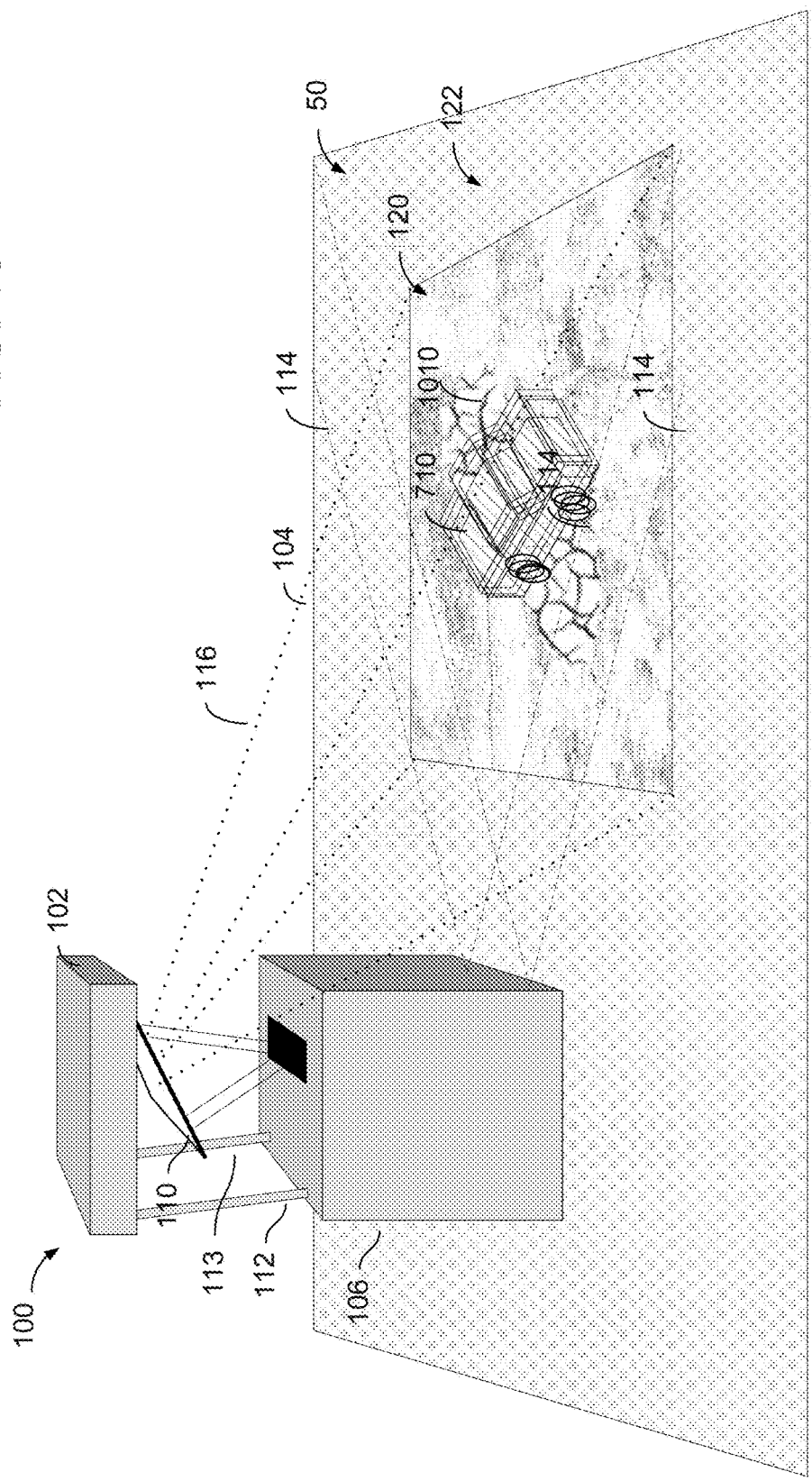
FIG. 10 is a perspective view of the integrated processing and projection device illustrating activation of an active object in the projection area.

FIG. 10 illustrates another exemplary type of object and trigger specific feedback using an active object 702. In the projection area 120, a rough area 1010 is depicted over which an object 710 may pass. In one embodiment, the trigger zone may be defined as the two-dimensional area of the rough patch 1010 and some vertical area above the patch 1010. Object 710 may comprise an active object such that when object 710 engages a rougher patch of road at 1010, the object can be instructed to vibrate in response to the positioning of the object. Any number of different scenarios may enable active feedback of the object 1010 a manner similar to that illustrated in FIG. 10. Additional feedback may be provided in conjunction with the vibration, such as displaying water or dirt along with the rough patch 1010 and having splashing water or spraying dirt displayed as the object passes the rough section of road 1010.

Figure 11:
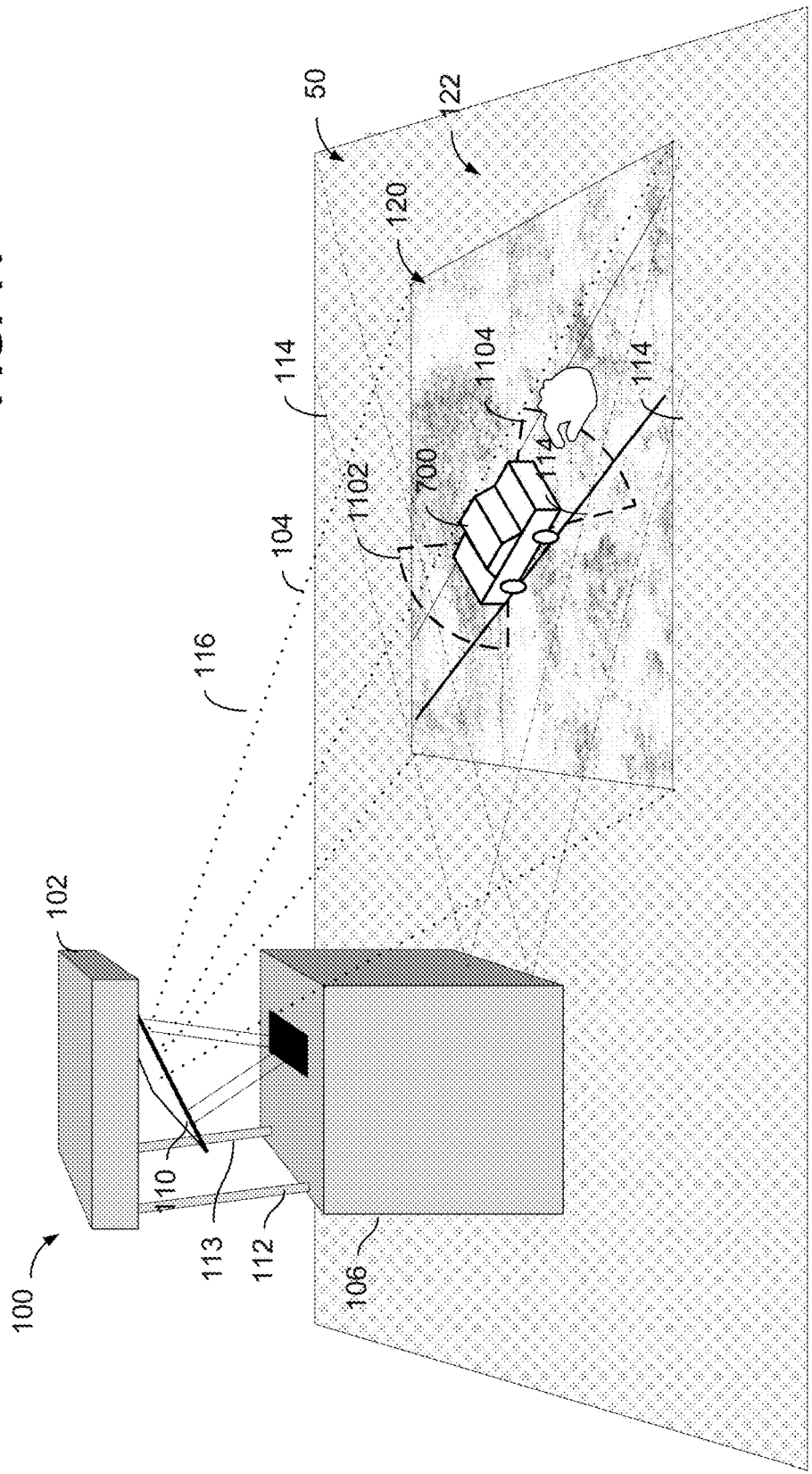
FIG. 11 is a perspective view of the integrated processing and projection device illustrating trigger zones attached to an object.

In the example of FIG. 10, the trigger zone is associated with the surface 50 within the display area and defined relative to the surface area. FIG. 11 illustrates a use of trigger zones which are defined relative to the real object 700 in a display area 120. Two trigger zones 1102 and 1104 are shown. In this embodiment, the trigger zones 1102 and 1104 are two-dimensional trigger zones positioned adjacent to surface 50 at the front and rear of object 700. Here the zones are semi-circular, but the trigger zones may take any geometrical shape. Movement of the object to engage a user hand or other object within the trigger zone can enable different actions and displays on the part of the projector 170.

Figure 12:
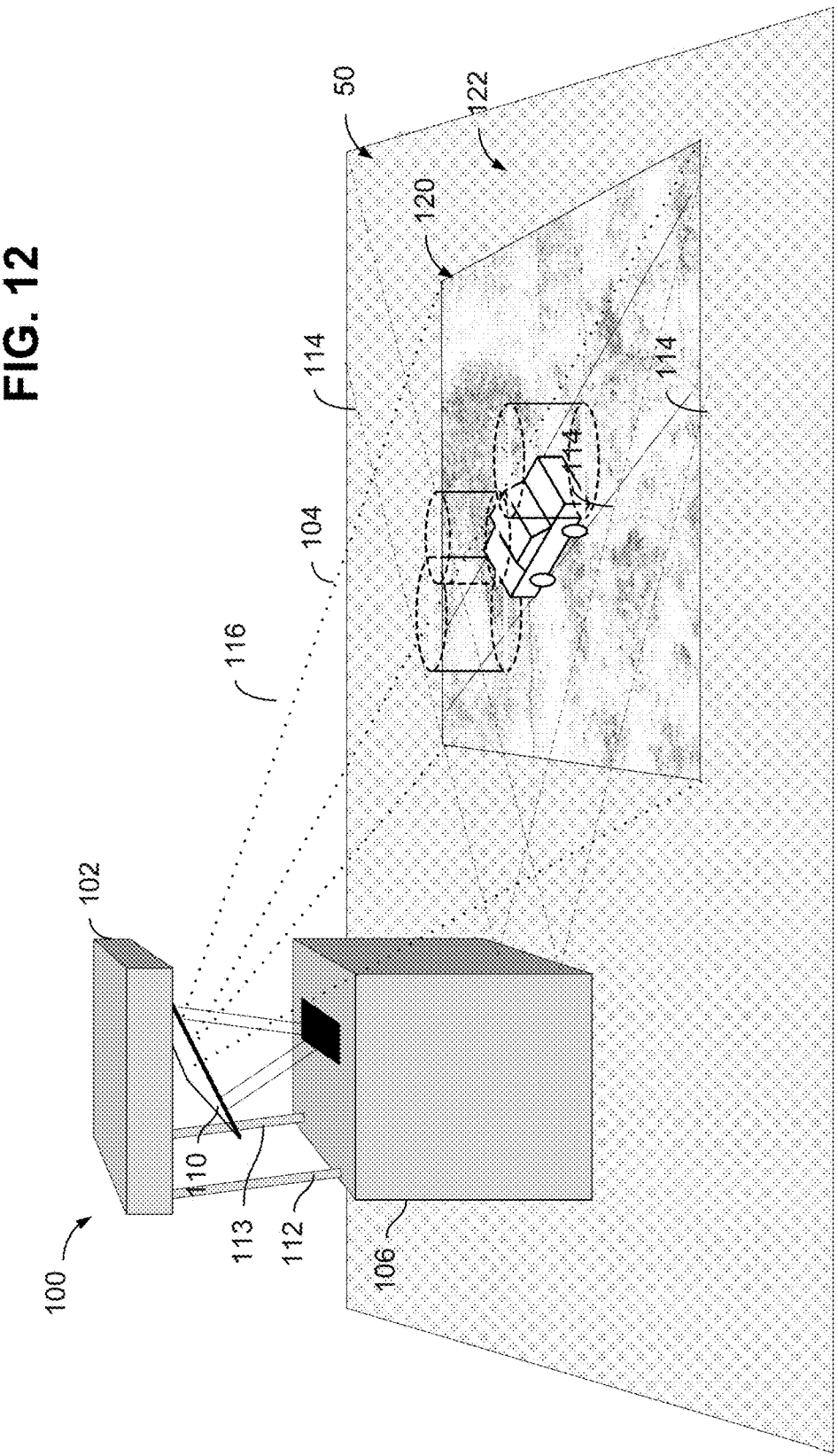
FIG. 12 is a perspective view of the integrated processing and projection device illustrating rigger zones attached to a display area.

FIG. 12 illustrates an alternative embodiment showing 3 trigger zones 1202, 1204 and 1206. Trigger zones 1202, 1204 and 1206 are cylindrical trigger zones position at the front top and rear of object 700. Zones 1202, 1204 and 1206 are, in one embodiment, tied to the surface 50 such that movement the object vertically or horizontally within the trigger zones initiates an action in response to part of the device 100. In an alternative embodiment, trigger zones 1202, 1204 and 1206 may be tied to and move with the object 700.

Figure 13:
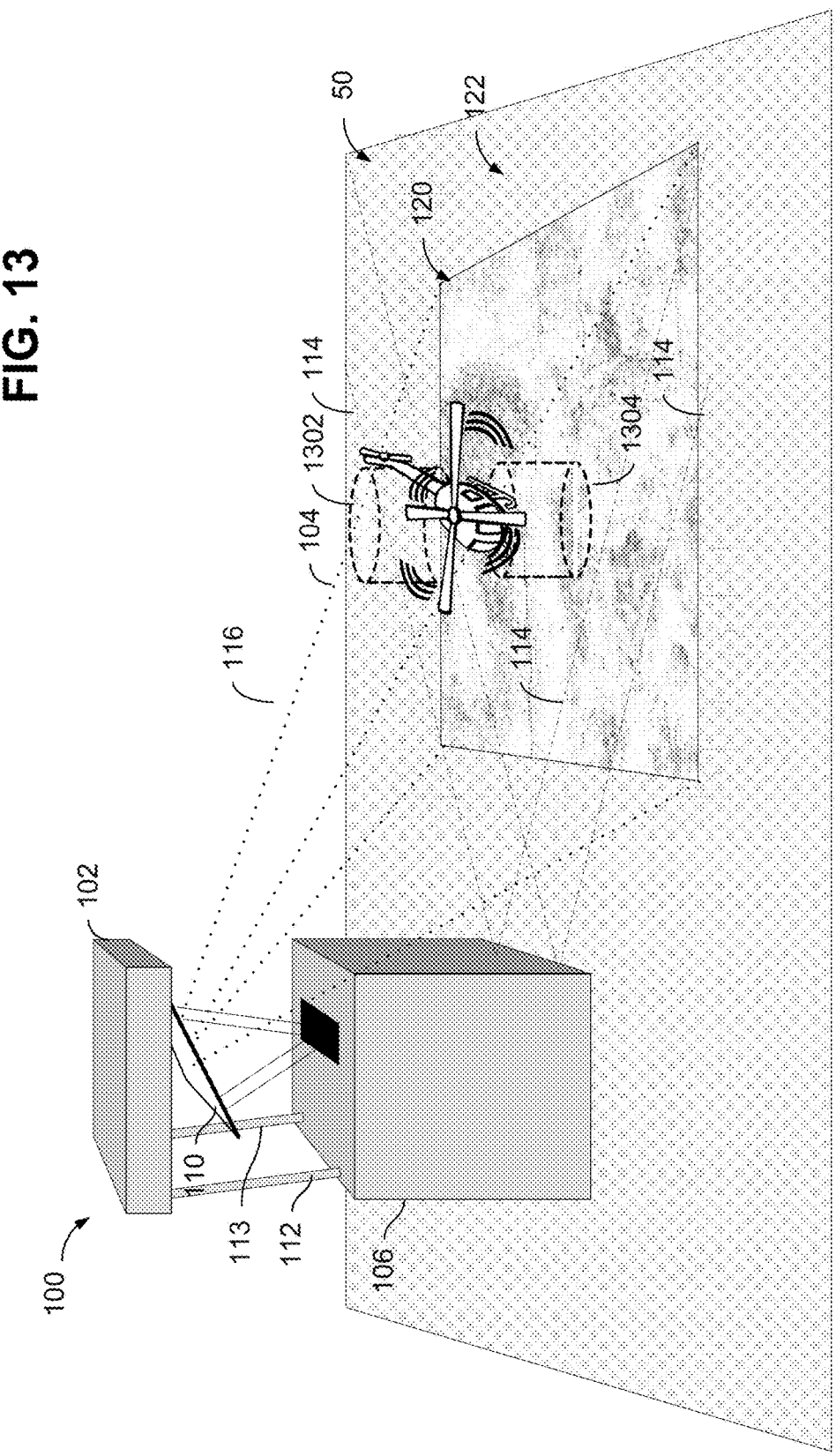
FIGS. 13 and 14 are perspective views of the integrated processing and projection device illustrating feedback provided relative to trigger zones.
Figure 14:
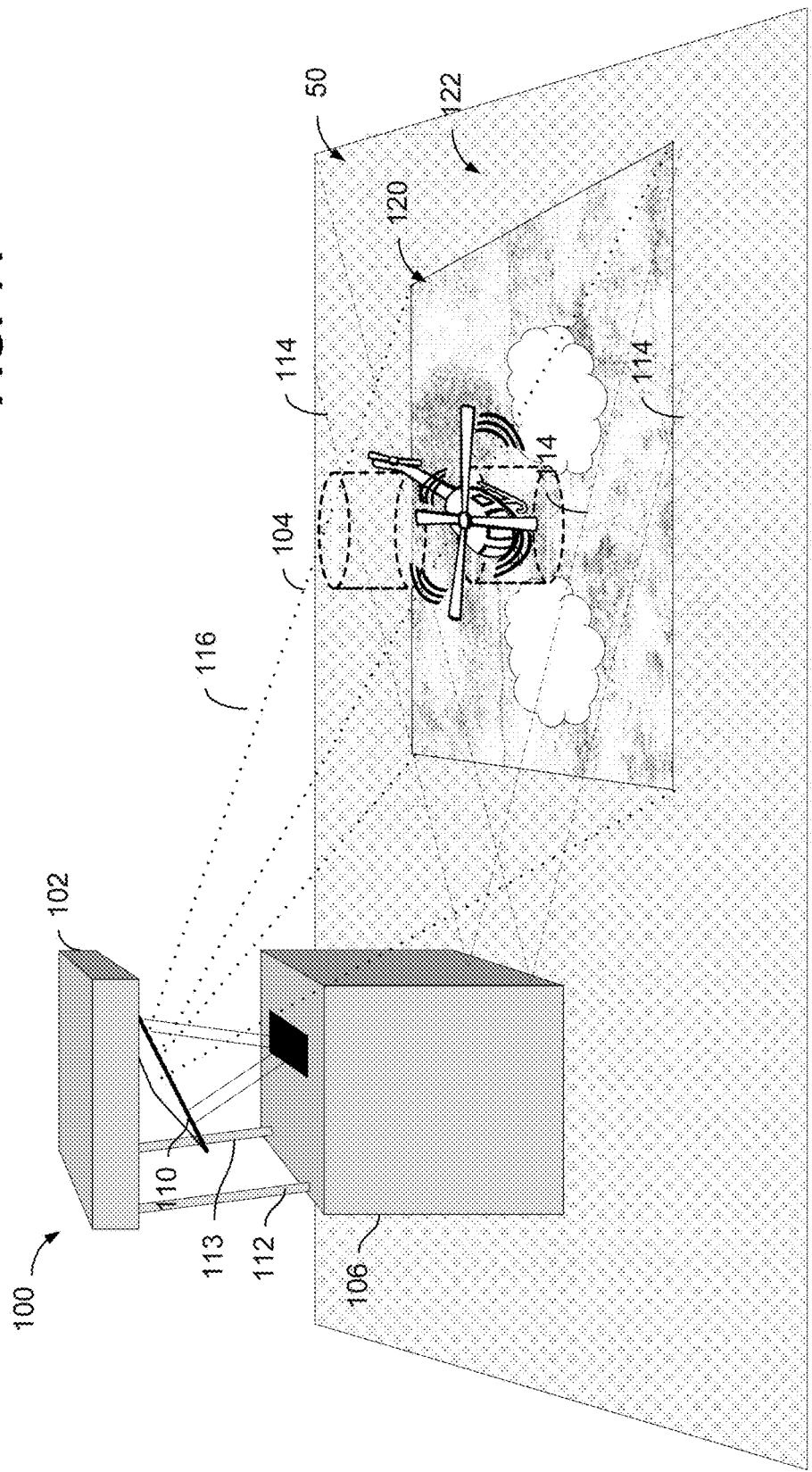

FIGS. 13 and 14 illustrate another embodiment of combined feedback which may be provided using cylindrical trigger zones positioned at the top and bottom of the object 802. Object 802, in this embodiment, as a helicopter and is an active object. One feature of the object 802 may be a controllable rotation of the helicopter rotors at varying speeds. Movement of the object within the respective trigger zones 1302 and 1304 may change both the speed of rotation and the display 120. As illustrated in FIG. 14, as the object moves closer to the surface 50 and into zone 1304 dust appears in the display area as would happen if a true helicopter was hovering closer to the surface of the ground. Simultaneously, the speed of the rotors may decrease. Conversely when the object is moved into zone 1302, the speed of the rotor may increase as may happen when the helicopter increases in height.

Figure 15:
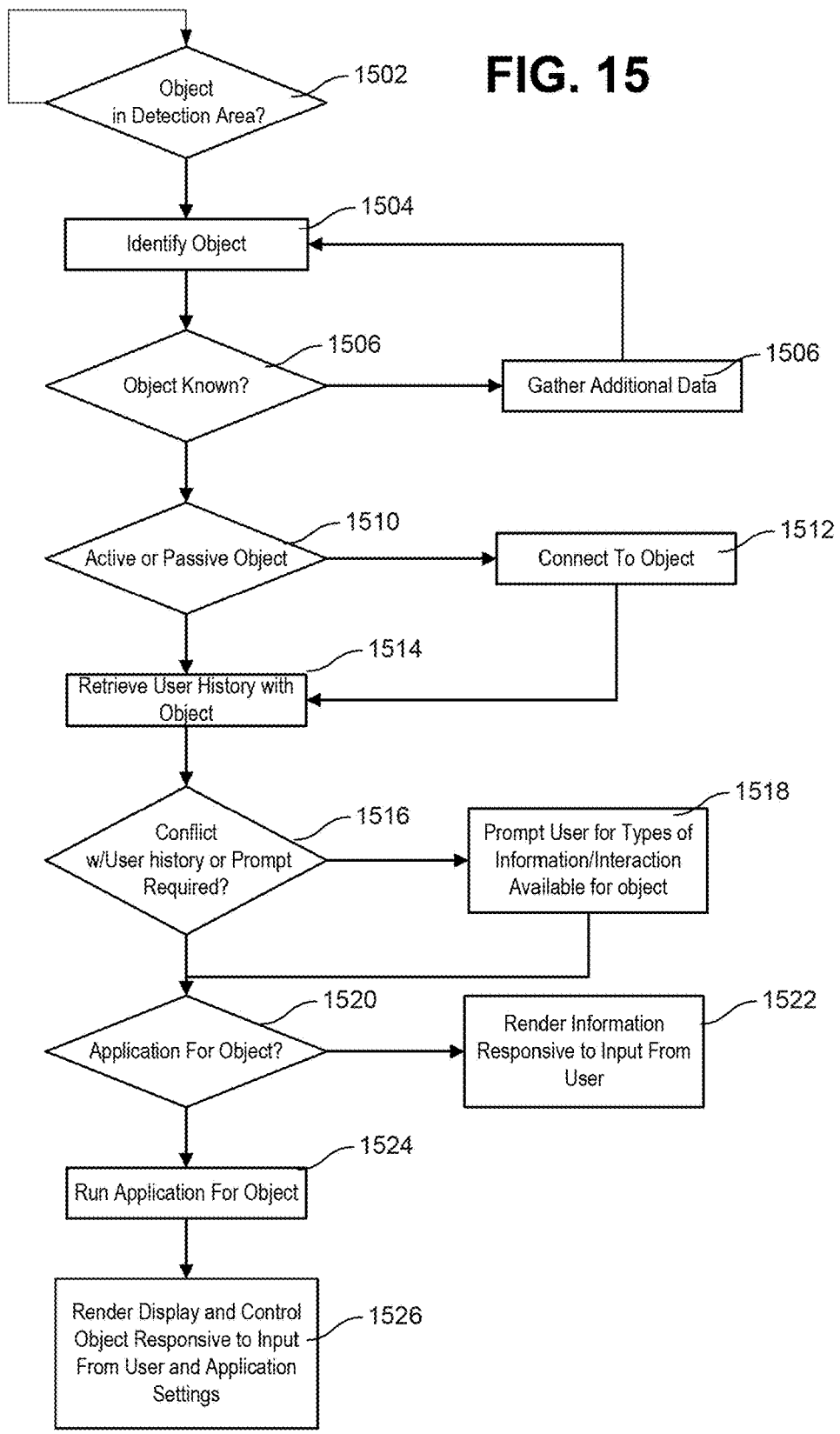
FIG. 15 illustrates a processor implemented method which may be performed to provide trigger zone and object related feedback.

FIG. 15 illustrates a processor implemented method which may be performed by device 100 in accordance with the present technology to provide trigger zone and object related feedback. At 1502, a determination is made as to whether or not an object is within a detection area 122. At 1504, an attempt is made to identify the object. An object may be detected by communication from the object (if an active object) with the device 100 or through the various sensors including the IR detector 150, RGB camera 160 and if available the capture device 322. The object is not known, then additional data may be gathered at 1506. If the object is known at 1506, then a determination is made at 1510 as to whether the object is active or passive. If the active object has not previously connected to identify itself as an active object, then at 1512 a communicative connection is made to the object. A determination may be made as to the nature of instructions, features and controllable functions of the active object at 1512. At 1514, user history with the object, if available, is retrieved. At 1516, a determination made as to whether or not there is a conflict between the user history and the objects identification or feedback to be provided, or whether, for any reason, the users should be prompted to provide additional information about the object. If a prompt is required at 1516, then the user is prompted for different types of information or actions available for the object at 1518. One form of prompting may be the use of interface 802 described above. At 1520, a determination is made is whether not an application 260 for the object is available. Each of the objects may have feedback provided by a general application or object specific applications 260. For example, the helicopter object may have an associated helicopter game application to be used specifically with the object. Such helicopter game application may define the trigger zones and the object specific feedback that should be provided in the zones based on the object and trigger interactions. If no object specific application is present, then object information and feedback may be provided by device 100 based on a general object identification and display application. In the examples shown herein, the device 100 may identify an object—such as object 800—and prompt the user for the type of information to provide (as illustrated in FIG. 8) or provide information automatically based on user history with the object. If an object specific application is present at 1520, then at 1524 the application executes feedback in the form of display and object controls is provided at 1526.

Figure 16:
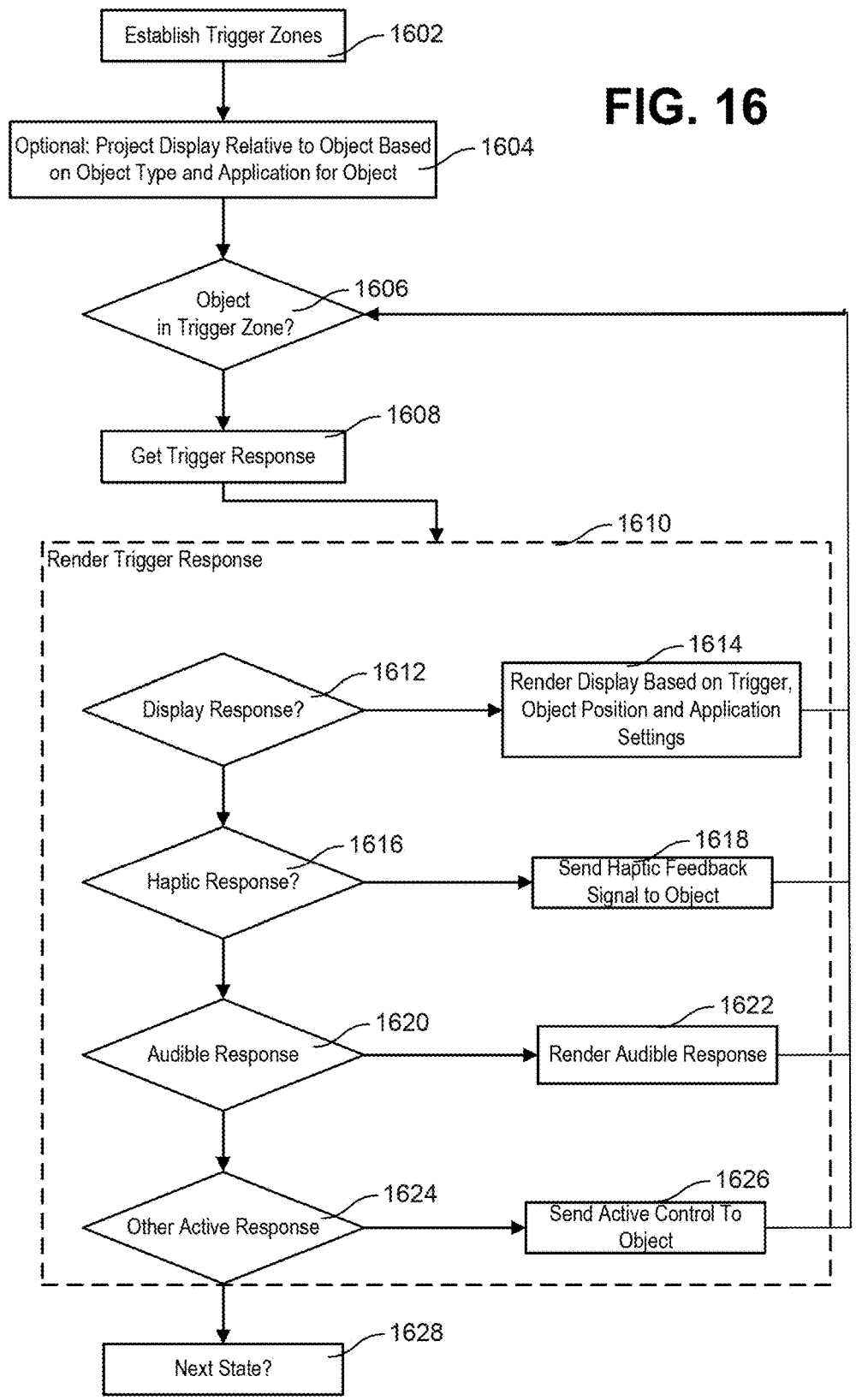
FIG. 16 is a flowchart illustrating a method for providing feedback when an object or a user appendage enters a trigger zone.

FIG. 16 is a flowchart illustrating a method for providing feedback when an object or a user appendage enters a trigger zone. The method of FIG. 16 may be implemented by the integrated processing and display device 100 as a service to object specific applications or a general object feedback application executing on device 100. At 1602, trigger zones are established. The trigger zones may take any form as illustrated and described herein. The trigger zones may be established by an object specific application or by device 100 in presenting a user interface or in any area around an object identified in the detection area 122. At 1604, optionally, display feedback may be projected relative to an object based on object type and an object specific application for the object. At 1606, a determination is made as to whether or not an object is in the trigger zones and display areas. If an object or user appendage is in a trigger zone, then at 1608, the trigger response is retrieved and rendered at 1610. The trigger response may be provided by the object specific application or the general feedback application as described above. The feedback response may be any of a number of different types of response. If the feedback is a display response at 1612, then at 1614 the display response is rendered based on the trigger the object position and the application settings. If the response is a haptic response at 1616, then at 1618 a haptic response signal instructing an active object to provide haptic feedback is sent haptic response feedback will be provided at 1618. If the feedback is audible feedback at 1620, then at 1622 an audible response will be generated and sound via speaker 244. If the response is another type of active feedback at 1624, then an active control signal will be send to the object at 1626. At 1628 the application state will be updated and the method of FIG. 16 will return to step 1602 to await further object detection.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

For purposes of this document, reference in the specification to "an embodiment," "one embodiment," "some embodiments," or "another embodiment" may be used to describe different embodiments and do not necessarily refer to the same embodiment.

For purposes of this document, the term "set" of objects refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Exemplary Embodiments

Exemplary embodiments of the technology include an integrated processing and projection system, comprising: a display projector in a housing, the display projector adapted to display an interface in a display area on a surface supporting the housing; an RGB camera; an infrared emitter and infrared detector, the RGB camera, emitter and detector establishing a detection area adjacent to the surface and overlapping the display area; a processor and memory in the housing, the memory including code operable to instruct the processor to establish one or more trigger zones in a corresponding one or more regions of the detection area; and responsive to interaction by a real object in the one or more trigger zones, cause object feedback to emanate from the system using one or more output elements of the integrated processing and projection system.

Embodiments of the technology further include any of the aforementioned embodiments in combination and further including code operable to instruct the processor to monitor images from the RGB camera and the infrared detector and operable to detect one or more real objects in the trigger zone.

Embodiments of the technology further include any of the aforementioned embodiments in combination wherein the code is operable to establish a two dimensional trigger zone on the surface.

Embodiments of the technology further include any of the aforementioned embodiments in combination wherein the code is operable to establish a three dimensional trigger zone at least a portion of which including the surface.

Embodiments of the technology further include any of the aforementioned embodiments in combination wherein the feedback comprises a display element related to the real object based on object interaction in the trigger zone.

Embodiments of the technology further include any of the aforementioned embodiments in combination wherein the real object comprises an active real object having controllable features, the integrated processing and projection system includes a communication interface, and the code is operable to output a signal via the communication interface to activate a controllable feature of active real object.

Embodiments of the technology further include any of the aforementioned embodiments in combination wherein the code is operable to cause object feedback of a display element simultaneously with activation of the controllable feature.

Embodiments of the technology further include any of the aforementioned embodiments in combination wherein the code is operable to display a user interface on the surface, wherein the one or more trigger zones comprise inputs to the user interface, and wherein the one or more real objects comprise at least an appendage of a user.

Embodiments of the technology further include any of the aforementioned embodiments in combination wherein the feedback is any one of each of audible feedback, display feedback, and an active controlled feedback in an active object.

Embodiments of the technology may include a processor implemented method of displaying feedback related to real objects and trigger zones in a projected display area, comprising: rendering a display area on a supporting surface using an interaction device including both the processor and a projector provided in a housing on the supporting surface; monitoring a display area utilizing sensors provided in the housing, each of the sensors having a field of view defining a detection area including at least the display area; establishing one or more trigger zones in a corresponding one or more regions of the detection area; and responsive to interaction by an object in the one or more trigger zones detected by said monitoring, causing object feedback from the device using one or more output elements of the device.

Embodiments of the technology may further include any of the aforementioned embodiments in combination wherein the establishing comprises defining a two dimensional area of the display area and the trigger zone includes the two dimensional area and an area bounded by the two dimensional area having a height above the surface.

Embodiments of the technology may further include any of the aforementioned embodiments in combination wherein the establishing comprises defining a three dimensional area of the display area not including any portion of the surface.

Embodiments of the technology may further include any of the aforementioned embodiments in combination wherein the interaction occurs when the object enters at least a portion of the trigger zone.

Embodiments of the technology may further include any of the aforementioned embodiments in combination and further including displaying a user interface on the surface, wherein the one or more trigger zones comprise inputs to the user interface, and wherein the one or more objects comprise at least an appendage of a user.

Embodiments of the technology may further include any of the aforementioned embodiments in combination wherein the sensors include at least an RGB camera and an infrared detector positioned in the housing, the detector adjacent to the surface when the housing rests on the surface, and said monitoring comprises comparing image data from the camera and detector to determine said interaction.

Embodiments of the technology may include a computer storage device including code operable to instruct a processor to control an interaction device including both the processor and a projector provided in a housing on a supporting surface, the code comprising: code operable to monitor the surface in a display area defined by the projector using a first sensor and a second sensor, each sensor providing images of a field of view comprising a detection area encompassing the display area; code operable to establish one or more trigger zones in a corresponding one or more regions of the detection area; and code operable to cause object cause object feedback relative to an object to emanate from the device using one or more output elements of the interaction device to entrance by the object into the one or more trigger zones.

Embodiments of the technology may include wherein the feedback comprises a projection of a reaction to the entrance of the object into the trigger zone based on a projected display area and related to object interaction with the projected display area.

Embodiments of the technology may include wherein the object comprises an active real object having controllable features, the interactive device includes a communication interface, and the device include code operable to output a signal via the communication interface to activate a controllable feature of active real object.

Embodiments of the technology may include wherein the code is operable to cause a display of a user interface on the surface, and wherein the one or more trigger zones comprise inputs to the user interface.

Embodiments of the technology may include wherein the trigger zone includes a three dimensional area of the display area attached to an object in the display area and movable with the object in the display area.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processor implemented method of displaying feedback related to real objects and trigger zones in a projected display area, the processor implemented method comprising:

rendering, via an interaction device, a display area comprising a user interface on a surface supporting the interaction device, the interaction device comprising the processor and a projector;

monitoring the display area utilizing sensors of the interaction device, each of the sensors having a field of view defining a detection area including at least the display area;

establishing one or more trigger zones in a corresponding one or more regions of the detection area, the one or more trigger zones comprising inputs to the user interface;

responsive to a real object entering at least a portion of a trigger zone of the one or more trigger zones detected by said monitoring, causing object feedback to emanate from the interaction device using one or more output elements of the interaction device, the object feedback including visible light display feedback projected onto the real object by the projector, the real object comprising at least an appendage a user;

detecting movement of the real object within the display area; and responsive to detecting the movement of the real object within the display area, causing the visible light display feedback projected onto the real object to move with the real object.

2. The processor implemented method of claim 1 wherein the establishing comprises defining a two dimensional area of the display area and the trigger zone includes the two dimensional area and an area bounded by the two dimensional area having a height above the surface.

3. The processor implemented method of claim 1 wherein the establishing comprises defining a three dimensional area of the display area not including any portion of the surface.

4. The processor implemented method of claim 1, wherein the sensors include at least an RGB camera and an infrared detector, the infrared detector adjacent to the surface when the housing rests on the surface, and said monitoring comprises comparing image data from the RGB camera and the infrared detector to determine said interaction.

5. A computer storage device including code operable to instruct a processor to control an interaction device, the interaction device including the processor, a communication interface, and a projector provided within a housing that supports the interaction device on a surface, the code operable to:

using a first sensor and a second sensor, monitor the surface in a display area defined by the projector, each of the first sensor and the second sensor configured to provide images of a field of view comprising a detection area encompassing the display area;

establish one or more trigger zones in a corresponding one or more regions of the detection area, the one or more trigger zones comprising inputs to a user interface displayed on the surface via the projector;

cause object feedback relative to an active real object having controllable features to emanate from the interaction device using one or more output elements of the interaction device, the object feedback including visible light display feedback projected via the projector onto a portion of the display area where the active real object is located and not projected onto one or more portions of the display area where the active real object is not located; and output a signal via the communication interface of the interaction device to activate a controllable feature of the active real object.

6. The computer storage device of claim 5, wherein the object feedback comprises a projection of a reaction to the active real object entering into the trigger zone based on a projected display area and related to object interaction with the projected display area.

7. The computer storage device of claim 5 wherein a trigger zone includes a three dimensional area of the display area attached to an object in the display area and movable with the object in the display area.

8. An integrated processing and projection system, comprising:

a display projector adapted to display a user interface in a display area on a surface supporting a housing of the system;

sensors each having a field of view encompassing a detection area including at least the display area, the sensors configured to monitor the detection area;

a processor; and memory storing instructions executable by the processor to render the user interface;

establish one or more trigger zones in a corresponding one or more regions of the detection area, the one or more trigger zones comprising inputs to the user interface;

detect, via the sensors, a real object entering at least a portion of a trigger zone of the one or more trigger zones, the real object comprising at least an appendage of a user;

in response to detecting the real object entering at least the portion of the trigger zone, output object feedback including visible light display feedback projected onto the real object by the display projector;

detect movement of the real object within the display area; and in response to detecting the movement of the real object within the display area, cause the visible light display feedback projected onto the real object to move with the real object.

9. The integrated processing and projection system of claim 8, wherein the instructions are executable to establish the one or more trigger zones by defining a two-dimensional area of the display area, and establishing a trigger zone including the two-dimensional area and an area bonded by the two-dimensional area having a height above the surface.

10. The integrated processing and projection system of claim 8, wherein the instructions are executable to establish the one or more trigger zones by defining a three-dimensional area of the display area that does not include any portion of the surface.

11. The integrated processing and projection system of claim 8, wherein the sensors comprise at least a RGB camera and an infrared detector, the infrared detector being adjacent to the surface when the housing rests on the surface, and wherein the sensors are configured to monitor the detection area via image data obtained from the RGB camera and the infrared detector.

* * * * *